(12) United States Patent
Quijano et al.

(10) Patent No.: US 10,372,173 B2
(45) Date of Patent: Aug. 6, 2019

(54) MOUNTING ENCLOSURES

(71) Applicant: Hewlett-Packard Development Company, L.P., Houston, TX (US)

(72) Inventors: David Quijano, Fort Collins, CO (US); Adolfo Adolfo Gomez, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/708,486

(22) Filed: Sep. 19, 2017

(65) Prior Publication Data
US 2019/0086972 A1  Mar. 21, 2019

(51) Int. Cl.
*G06F 1/16* (2006.01)
*G06F 1/18* (2006.01)

(52) U.S. Cl.
CPC ............ *G06F 1/181* (2013.01); *G06F 1/1632* (2013.01)

(58) Field of Classification Search
CPC ....... G06F 1/1632; G06F 1/181; F16M 13/02; F16M 11/041
See application file for complete search history.

(56) References Cited

U.S. PATENT DOCUMENTS

| | | | |
|---|---|---|---|
| 6,307,745 B1* | 10/2001 | Liebenow | G06F 1/1656 361/679.41 |
| 6,321,335 B1* | 11/2001 | Chu | G06F 1/181 726/28 |
| 7,075,781 B2* | 7/2006 | Peng | G06F 1/1616 361/679.55 |
| 7,159,053 B1 | 1/2007 | Lakin | |
| 7,377,603 B2 | 5/2008 | Quijano | |
| 7,719,832 B2 | 5/2010 | Kobara et al. | |
| 7,742,294 B2* | 6/2010 | Gadau | G06F 1/1616 361/679.4 |
| 7,768,776 B1* | 8/2010 | Szeremeta | G11B 33/027 360/133 |
| 8,045,325 B2* | 10/2011 | Weng | G06F 1/187 361/679.33 |
| 8,542,495 B1* | 9/2013 | Gorman | G06F 1/1656 361/679.02 |
| 2006/0082265 A1* | 4/2006 | Quijano | G06F 1/181 312/223.2 |

(Continued)

OTHER PUBLICATIONS

Dell Wyse P25 Class Dual VESA Mounting Bracket Kit Thin Client to Monitor Mounting Kit for Dell Wyse P25 Zero Client Dell Wyse P25 Class Dual VESA Mounting Bracket Kit, https://www.newegg.conn/Product/Product.aspx?Item=0B1-00SB-00005.

(Continued)

*Primary Examiner* — Dimary S Lopez Cruz
*Assistant Examiner* — Abhishek M Rathod
(74) *Attorney, Agent, or Firm* — HP Inc. Patent Department

(57) ABSTRACT

An example enclosure for a computing device includes a frame having an opening to receive a computing device, a plurality of panels and a retaining mechanism to retain the computing device within the frame. One of the plurality of panels comprises a port access opening. The enclosure also includes a security insert to be secured to the frame to restrict access to a port of the computing device through the port access opening.

14 Claims, 7 Drawing Sheets

(56) References Cited

U.S. PATENT DOCUMENTS

| | | | | |
|---|---|---|---|---|
| 2010/0264671 | A1* | 10/2010 | Zuo | H04M 1/0274 292/57 |
| 2011/0058332 | A1* | 3/2011 | Skillman | G06F 1/1626 361/679.58 |
| 2014/0125271 | A1* | 5/2014 | Wang | H02J 7/0027 320/107 |
| 2015/0047262 | A1* | 2/2015 | Lee | H05K 5/0239 49/394 |

OTHER PUBLICATIONS

ESI Ergo CPU-TC Thin Client CPU Holder, https://www.amazon.com/ESI-Ergo-CPU-TC-Client-Holder/dp/B01ASEGN62.
Thin Client Holder CPU Bracket: Thin Client CPU Mount Configures to Monitor Arms, Poles and Wall Track Systems, http://www.ergomart.com/LCD-LED-mounts-accessories/cpu-holder-thin-client.php.

* cited by examiner

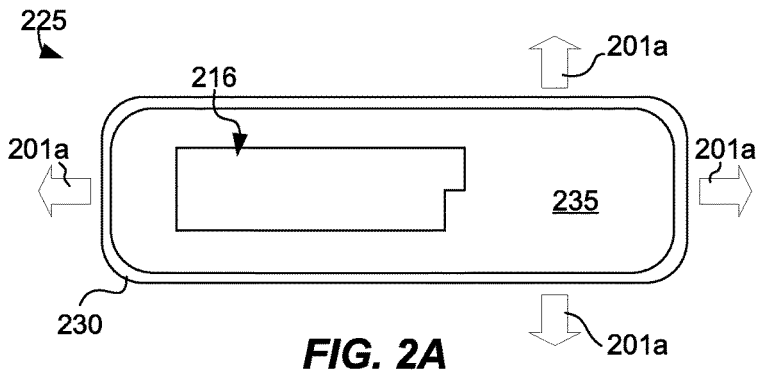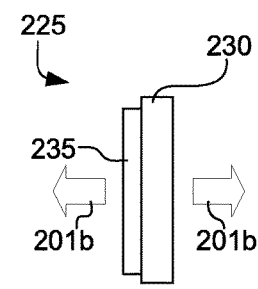
*FIG. 2A*  *FIG. 2B*
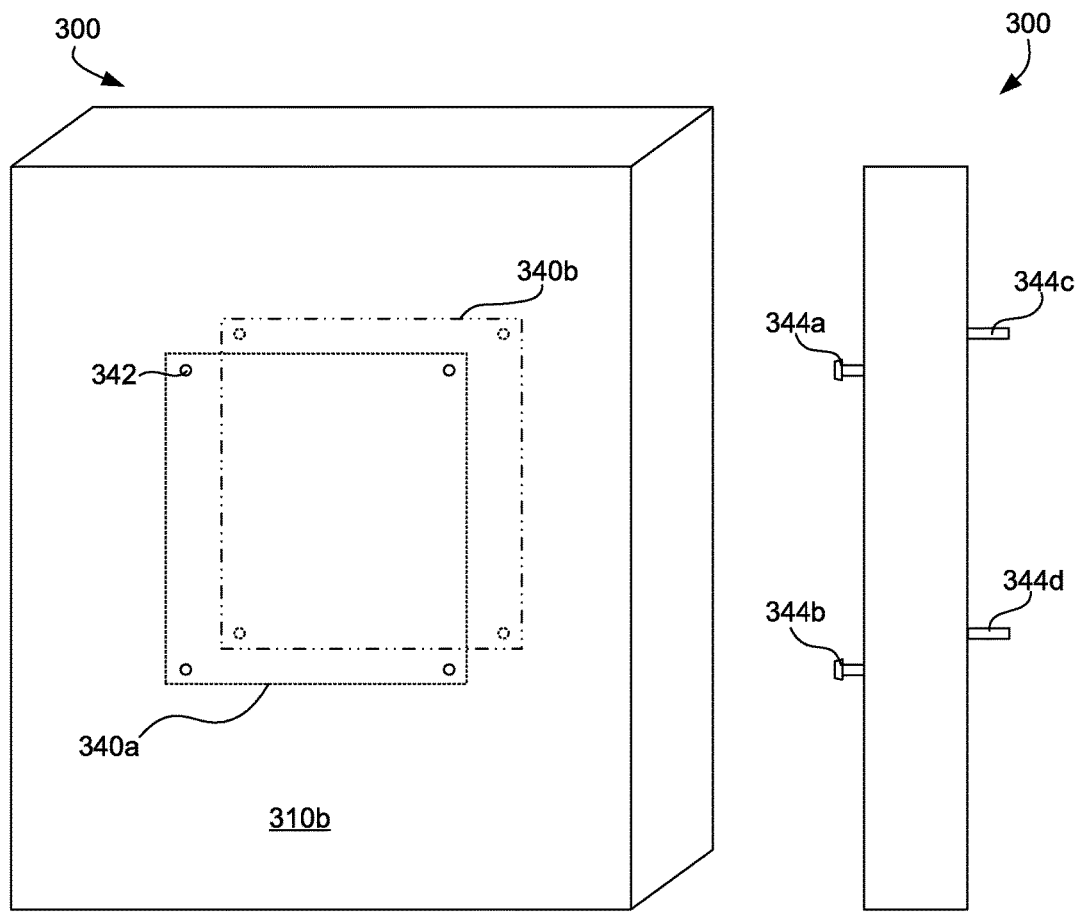
*FIG. 3A*  *FIG. 3B*

MOUNTING ENCLOSURES

BACKGROUND

In certain types of situations, computing devices may be secured within an enclosure.

BRIEF DESCRIPTION OF THE DRAWINGS

Various examples will be described below by referring to the following figures.

FIGS. 2A and 2B illustrate an example security insert;
FIGS. 3A and 3B illustrate an example enclosure.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration.

DETAILED DESCRIPTION

There may be a desire to secure computing devices from unauthorized access, such as due to hacking or theft. For instance, there may be an interest in protecting against those who might attempt to steal corporate secrets and data, referred to as corporate espionage and theft. Among other things, physically securing a computing device to a support may help to discourage corporate espionage and theft. However, such approaches, which at times may include the use of an enclosure, may not be flexible enough to allow an enclosure to be mounted in a number of different possible places, orientations, and/or arrangements. For example, a different enclosure may be used to mount a computing device to a desk or a wall, as opposed to mounting the computing device behind a display. There may be a desire, therefore, for an enclosure that may allow mounting of an enclosure in a variety of different locations without necessarily using a dedicated enclosure.

Another corporate espionage and theft concern could include unauthorized access to data ports of a computing device. For instance, examples of unauthorized access could include unauthorized saving of data to a memory device, or injecting malware or a virus (e.g., a Trojan horse) into the computing device to enable unauthorized access to the device or corporate network, by way of non-limiting example. Furthermore, there may be a desire for port securing mechanisms capable of securing a device using a security enclosure.

An enclosure for a computing device may therefore include openings for accessing ports and allowing heat dissipation. Inserts for the enclosure may allow the ports to be secured. Also, the enclosure may include a plurality of mounting interfaces, such as to enable mounting the enclosure in a variety of arrangements or locations.

Figure 1A:
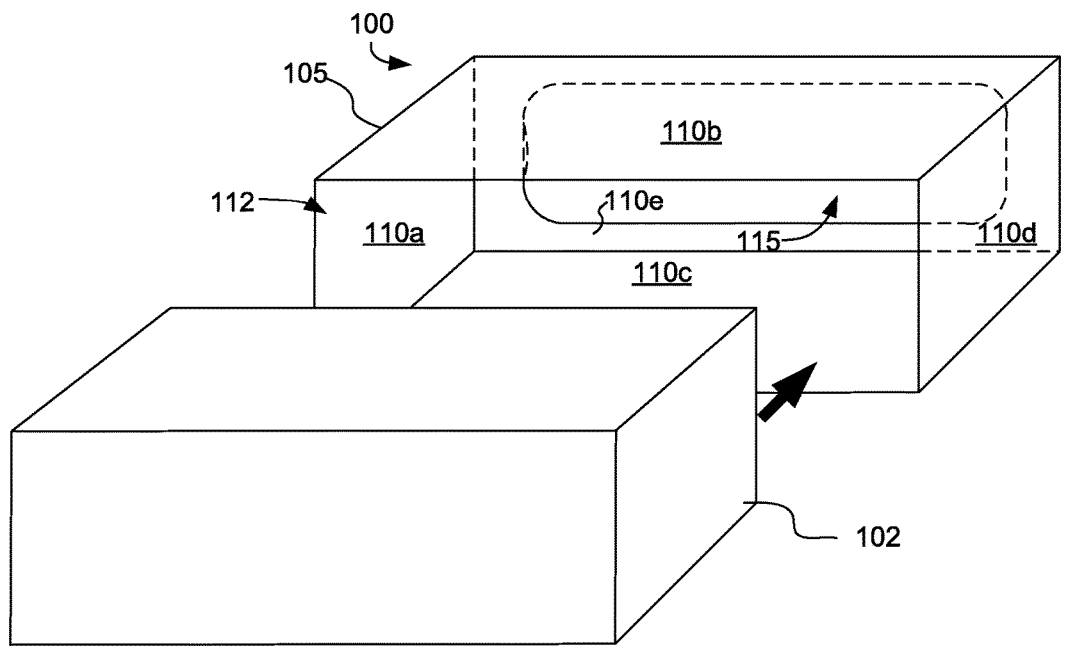
FIGS. 1A and 1B illustrate an example enclosure.
Figure 1B:
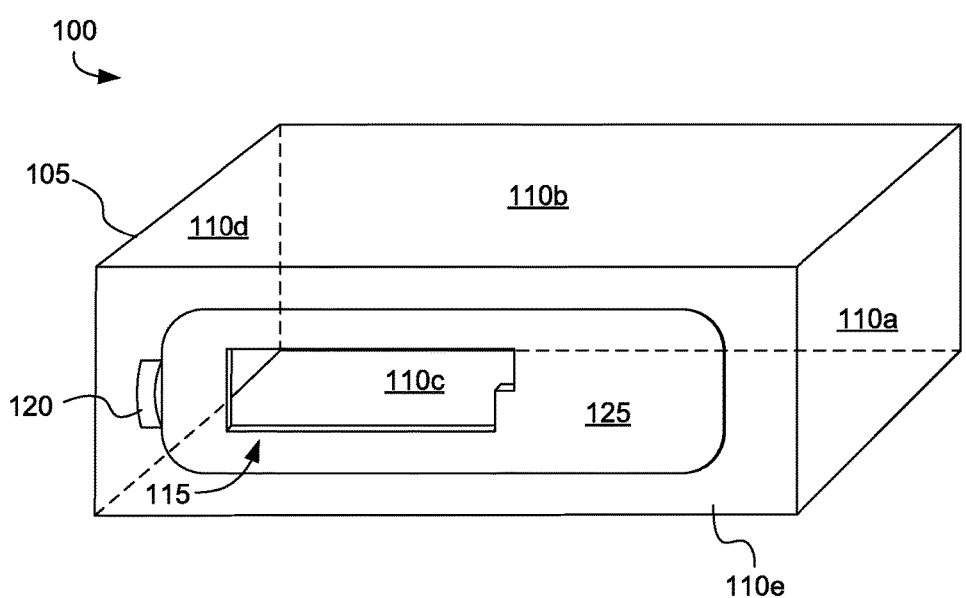

FIGS. 1A and 1B illustrate an example enclosure 100. As used herein, an enclosure refers to a structure that surrounds a computing device, such as computing device 102 (shown entering enclosure 100 in FIG. 1A). In one implementation, enclosure 100 may be in the form of a sleeve, which comprises an enclosure that surrounds an outer perimeter of a computing device. For instance, enclosure 100 is illustrated as having four panels, 110a, 110b, 110c, and 110d. Enclosure 100 may be rigid, such as to provide stability and security.

Enclosure 100 may comprise a frame 105, characterized by junctions of panels 110a, 110b, 110c, 110d, and 110e in the example of enclosure 100, in FIG. 1A. However, in some cases, enclosure 100 may comprise a frame that is independent of any panels. For example, a frame may have a skeletal structure to which panels may be attached, as opposed to the integral frame/panel structure illustrated in FIGS. 1A and 1B.

In one case, panels 110a-110e may comprise a rigid material, such as a metal or a metalloid, and may include openings, such as for venting and access to ports of a computing device. For example, entry opening 112 refers to an opening of enclosure 100 through which computing device 102 may be inserted. Port access opening 115 (at the back of enclosure 100 in FIG. 1A) refers to an opening of enclosure 100 through which ports of a computing device may be accessed.

As noted above, there may be a desire to secure a computing device within an enclosure, such as enclosure 100. Thus, retaining a computing device may comprise use of a retaining mechanism 120. In one case, retaining mechanism 120 may comprise a loop, such as a padlock loop, through which a locking mechanism may attach to secure computing device 102 within enclosure 100. Retaining mechanism 120 may be integrally formed with a panel or frame of enclosure 100, such as panel 110e or frame 105.

Retaining mechanism 120 may facilitate securing security insert 125 within port access opening 115. For example, at times at which computing device 102 is secured within enclosure 100 using retaining mechanism 120, security insert 125 may be held within port access opening 115. As such, in order to remove security insert 125, computing device 102 may be unsecured from (e.g., unlocked from) retaining mechanism 120 and removed (at least partially) from enclosure 100.

In view of the foregoing, security inserts, such as security insert 125, may be arranged in port access opening 115 to restrict access to ports of computing device 102. This may be accomplished by inserting computing device 102 into enclosure 100 and attaching computing device 102 to retaining mechanism 120. The secured computing device 102 thus keeps security insert 125 in place.

Enclosure 100 may take a number of different forms. In one case, side panels may be substantially planar. A planar upper panel (e.g., panel 110b) may be arranged approximately parallel to a planar lower panel (e.g., panel 110c). Also, a first planar side panel (e.g., panel 110a) may be approximately parallel to a second planar side panel (e.g., panel 110d). The first and the second planar side panels may be approximately perpendicular to the planar upper and the planar lower panel, as shown in FIGS. 1A and 1B. The planar upper and lower panels may be connected to the first and the second planar side panels (e.g., forming a frame junction). A planar back panel may be connected to the planar upper and lower panels and may be substantially perpendicular to the planar upper and lower panels. In another case, the planar back panel may be connected to the first and the second planar side panels, and substantially perpendicular thereto. The planar back panel may be substantially perpendicular to the planar upper and lower panels and also the first and the second planar side panels in yet another implementation.

In one case, the panels of enclosure 100 may be integrally formed, such as from a single sheet of sheet metal. For instance, the single sheet of sheet metal may be formed and bent to form an enclosure comprising a plurality of panels. Structures, such as retaining mechanism 120 may also be integrally formed in the sheet of sheet metal.

Of course, the foregoing is presented merely by way of illustration and is not to be taken in a limiting sense. Indeed, as shall be further shown hereinafter, a number of enclosure implementations are within the scope of claimed subject matter.

Turning to FIG. 2A, an example security insert 225 is shown. As noted above, security insert 225 may be secured within a port access opening of an enclosure, such as port access opening 115 of enclosure 100. Security insert 225 may also have an opening 216 for access to selected ports. By way of example, opening 216 may give access to audio I/O ports, display ports (e.g., HDMI), universal serial bus (USB) ports, etc. Of course, in other cases, security insert 225 may not have any openings. Security insert 225 may be customized for a particular computing device, a particular arrangement of ports, a particular desired arrangement of accessible ports, etc. Securing security insert 225 within an enclosure may be accomplished in a number of ways. In one example, security insert 225 may comprise a perimeter portion 230 may be larger than a port access opening (e.g., port access opening 115) of an enclosure. See, for example, the larger perimeter portion 230 in FIG. 2B, where the raised portion corresponds to a size of a port access opening, and perimeter portion 230 is larger than the port access opening. Sizing perimeter portion 230 to be larger than a port access opening may be such that security insert 225 may not be easily pushed or pulled from an interior of an enclosure to an exterior of the enclosure through the port access opening (see, e.g., arrows 201b of FIG. 2B).

As noted, security insert 225 may have a raised portion 235 that may be sized to correspond a port access opening (e.g., port access opening 115). For example, raised portion 235 may be sized to fit within the port access opening. See, for example, raised portion 235 in FIG. 2B. Due, for example, to raised portion 235 being arranged within the port access opening, security insert 225 may not be easily pushed or pulled sideways or vertically (see, e.g., arrows 201a in FIG. 2A), such as parallel to a plane of a panel having the port access opening. Consequently, security insert 225 may resist movement (e.g., while a computing device is secured within the enclosure) in directions approximately parallel to a plane of a panel having a port access opening, and also in directions approximately perpendicular to the plane of the panel.

The foregoing is presented by way of example. Other implementations could include use of an adhesive, use of a locking mechanism to lock security insert 225 into an enclosure, etc. Thus, in some cases, security insert may be such that it may not be easily removed by those seeking to, for example, access a port that has been blocked, such as for security reasons.

Turning now to FIG. 3A, a view of an example enclosure 300 is provided having a first mounting interface 340a arranged on one panel 310b, and a second mounting interface 340b (shown with a dash-dot-dot pattern) arranged on a second panel, opposite panel 310b. As used herein, a mounting interface refers to an arrangement of components, such as apertures and fasteners, to enable mounting of a device. Standard mounting interface arrangements (e.g., comprising mounting apertures) may be established by groups or organizations, such as the Video Electronics Standards Association (VESA). For example, the VESA has established flat display mounting interface (FDMI) standards that specify distances between apertures based on, for instance, display size. Thus, as used herein, mounting interfaces, such as 340a and 340b, represent presently established standards for mounting interfaces and also standards to be established in the future. Furthermore, future standards could also extend beyond standards established by the Video Electronics Standards Association, such as to standards established (or to be established in the future) by other standards organizations.

It may be desirable to include multiple mounting interfaces on enclosure 300, such as to allow enclosure 300 to be mounted in a variety potential arrangements and orientations.

Figure 4A:
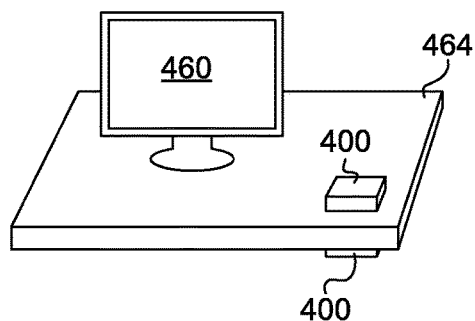
FIG. 4A shows an example enclosure mounted on a desk.

For example, in one implementation, mounting interfaces 340a and 340b may allow enclosure 300 to be mounted on a work surface or under a work surface, as illustrated by FIG. 4A. Indeed, FIG. 4A shows an example enclosure 400 mounted both above and below a mounting surface, referred to alternatively as a support surface 464. While enclosure 400 is secured to support surface 464, a computing device may be secured thereon, but may nevertheless be available to users (e.g., it may be possible to access ports of the computing device). Alternatively, enclosure 400 may be mounted so as to not be readily accessible to users, as shall be shown in the next examples.

Figure 4B:
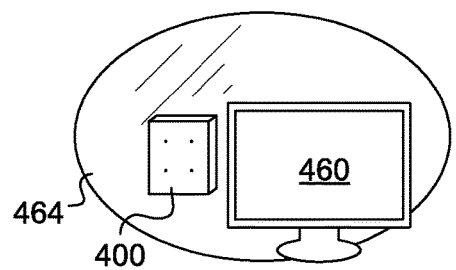
FIG. 4B shows an example enclosure mounted on a wall.

Returning to FIG. 3A, in another example implementation, mounting interfaces 340a and 340b may allow enclosure 300 to be mounted on a wall, as illustrated in FIG. 4B, where support surface 464 refers to a wall surface in the context of this figure. As such, either mounting interface 340a or 340b may be selected to mount enclosure 400 to support surface 464.

Figure 4C:
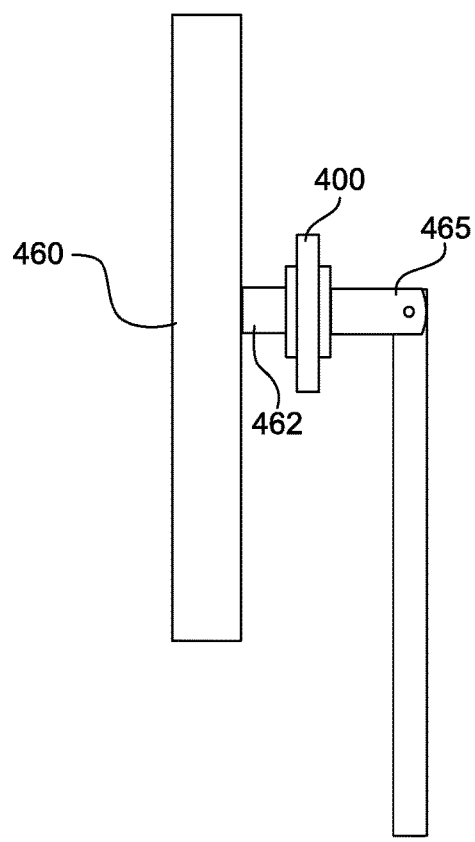
FIG. 4C shows an example enclosure mounted between a display and a support arm.

Mounting interfaces 340a and 340b of FIG. 3A may also allow enclosure 300 to be mounted between a display and a support arm. For instance, FIG. 4C illustrates a case in which display 460 has a display-side support 462 and a support arm 465, and enclosure 400 is mounted between display-side support 462 and support arm 465. In such a case, the inclusion of multiple mounting interfaces (such as 340a and 340b in FIG. 3A), may allow such a mounting arrangement.

FIG. 3B shows an example enclosure 300 from a side view to see fasteners 344a-344d. Enclosure 300 shows fasteners 344a and 344b inserted externally as to enclosure 300. And enclosure 300 shows fasteners 344c and 344d inserted internally as to enclosure 300. Thus, for example, in one case enclosure 300 may be first attached to a support surface (e.g., support 465 or display-side support 462 in FIG. 4C) using fasteners 344c and 344d. Of note, fasteners 344a and 344b (and corresponding apertures) are offset as to fasteners 344c and 344d (and corresponding apertures). Enclosure 300 may have tool apertures for insertion of tools, such as screw drivers, to access fasteners 344c and 344d. As such, in a case in which fasteners 344c and 344d are to be attached to a support surface, tools may be inserted through tool apertures to cause fasteners 344c and 344d to attach to the support surface. Subsequently, fasteners 344a and 344b may be used to attach enclosure 300 to another support surface (e.g., such as a support surface of support 465 or display-side support 462 of FIG. 4C). In addition, other apertures and/or fasteners may be included, such as to allow enclosure 300 to be secured to mounting interfaces of a computing device (see, e.g., example aperture 542b and fastener 544b in FIG. 5C).

Figure 5A:
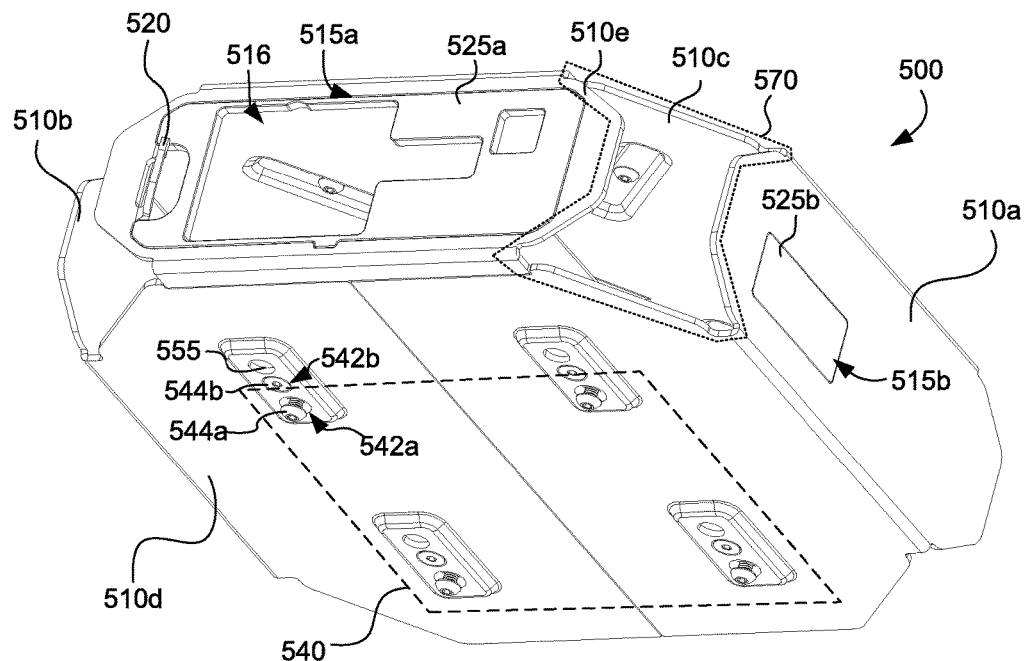
FIGS. 5A-5H provide a number of views of an example enclosure.
Figure 5B:
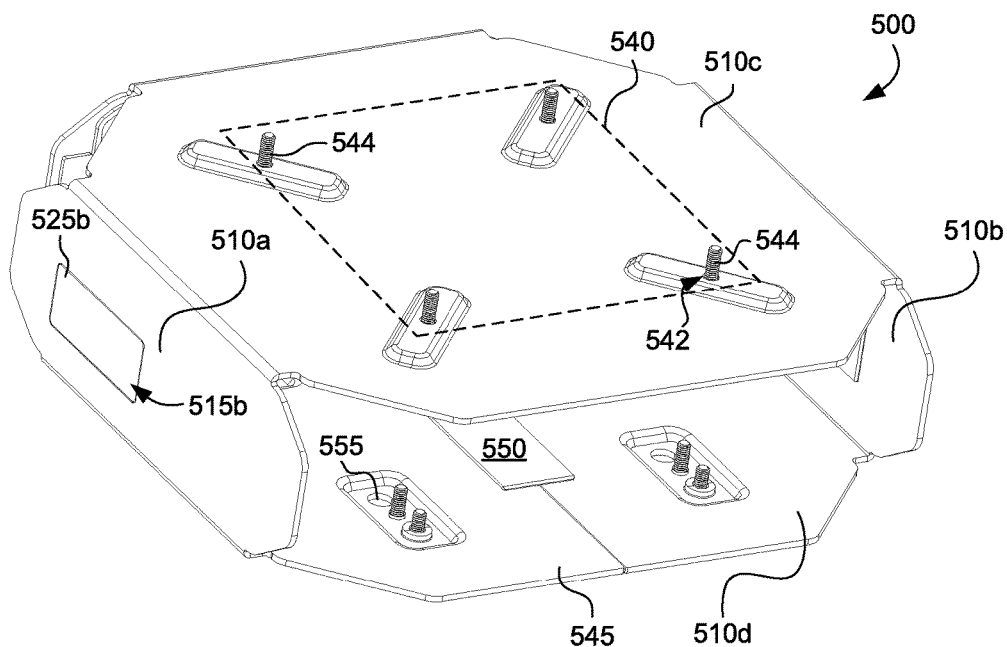

FIGS. 5A-5H are different views of an example enclosure 500. For example, FIGS. 5A and 5B show enclosure 500 made up of a plurality of panels 510a-510e. Enclosure 500 is an example enclosure corresponding to the HP Z2 MINI workstation by HP INC. Because the HP Z2 MINI workstation is vented at its corners, enclosure 500 may include gaps between panels, such as between panel 510e and 510a and between panels 510e and 510b (illustrated by example vent opening 570). By including venting openings at the corners of enclosure 500, it may be possible to surround a computing device with panels (e.g., providing security), while still providing openings for heat dissipation.

Panels of enclosure 500 may also include port access openings. For example, panel 510e includes a port access opening 515a and panel 510a includes a port access opening 515b. Security inserts 525a and 525b may be used to restrict access to ports of a computing device. In one case, for example, a security insert may completely obstruct access to ports of a computing device. For example, port access opening 515b may be to access side USB ports of a computing device. For security, it may be desirable to obstruct or otherwise restrict access to the USB ports. Therefore, security insert 525b may be designed to completely fill port access opening 515b, and thereby cover the USB ports of the computing device. In contrast, security inserts may be configured to allow partial access to ports of a computing device.

Figure 5C:
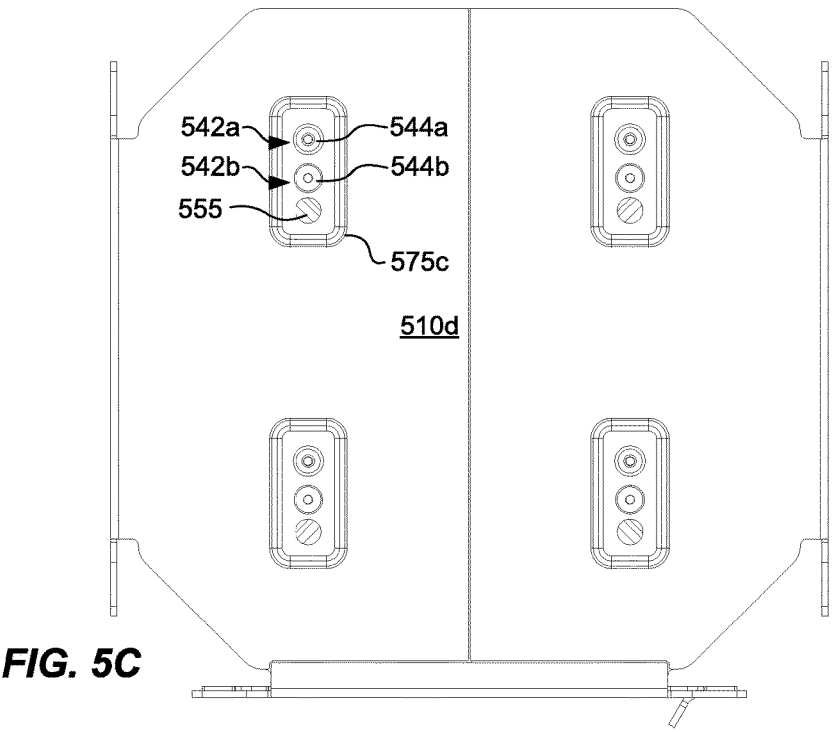
Figure 5D:
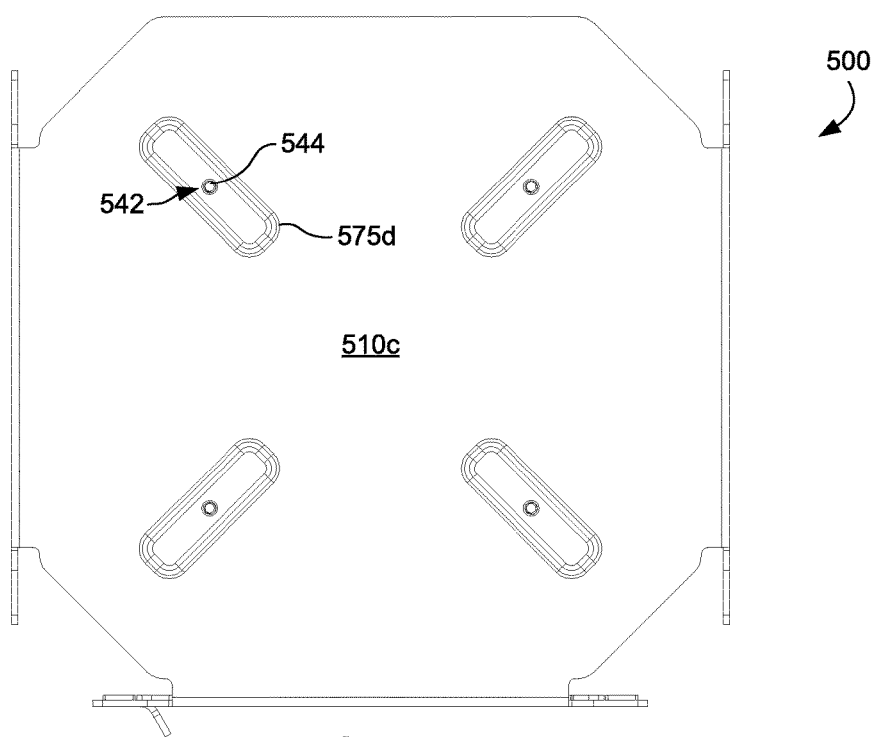

Security inserts 525a and 525b may be similar to security insert 225 of FIGS. 2A and 2B, such as to impede removal of security inserts 525a and 525b from enclosure 500. Taking security insert 525a by way of example, it may have a raised (inner) portion that may correspond to (and fit within) port access opening 515a. For instance, FIG. 5G is a profile view of enclosure 500, showing panel 510e from the exterior of enclosure 500. From this perspective, it should be apparent that a raised inner portion 535a of security insert 525a is arranged within a port access opening 515a. A security insert opening 516 is also visible through which parts of a computing device may be accessed externally as to enclosure 500. FIG. 5H shows the interior of panel 510e through entry opening 512 (e.g., through which a computing device may be inserted into enclosure 500). Perimeter portion 530 is also visible in the interior of enclosure. As should be apparent, perimeter portion 530 is wider than port access opening 515a, thus allowing security insert 525a to resist removal in at least one direction.

As such, when secured, security insert 525a may resist removal in directions approximately parallel to a plane of panel 510e (e.g., arrows 201a in FIG. 2A). Additionally, security insert 525a may have a perimeter portion (230 in FIGS. 2A and 2B) to impede removal of security insert 525a in directions approximately perpendicular to the plane of panel 510e (e.g., arrows 201b in FIG. 2B).

As noted, security inserts, such as security insert 525a, may also comprise a security insert opening 516. For instance, an opening in security insert 525a may permit access to desired ports (e.g., HDMI, DisplayPort, etc.). Use of security inserts, such as security insert 525a, may be desirable for allowing a variety of possible port access options. For example, at times, it may be desirable to leave more ports open, such as for a keyboard or a mouse, or at other times it may be desirable to obstruct all ports. Also, subsequent generations of the particular computing device may alter to some degree the arrangement of ports of a computing device. As such, an enclosure, such as enclosure 500, may be usable for multiple generations of a family of computing devices.

Figures 5E, 5F:
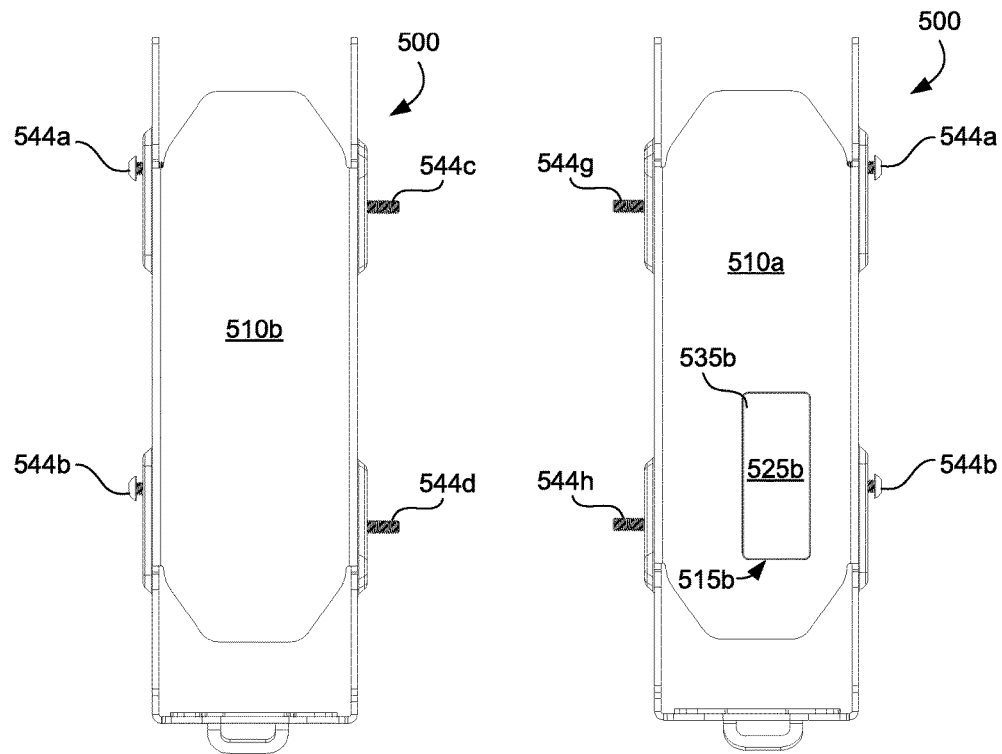
Figure 5G:
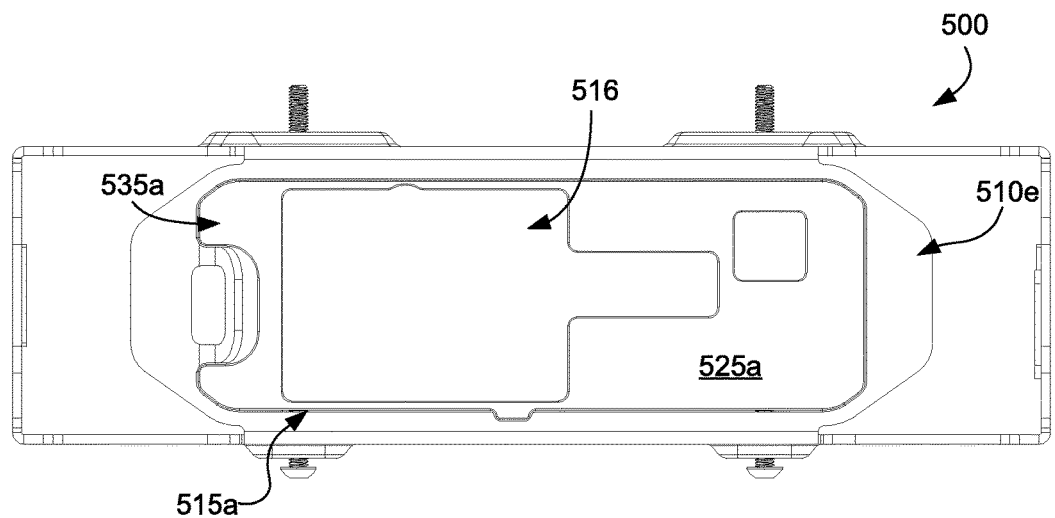
Figure 5H:
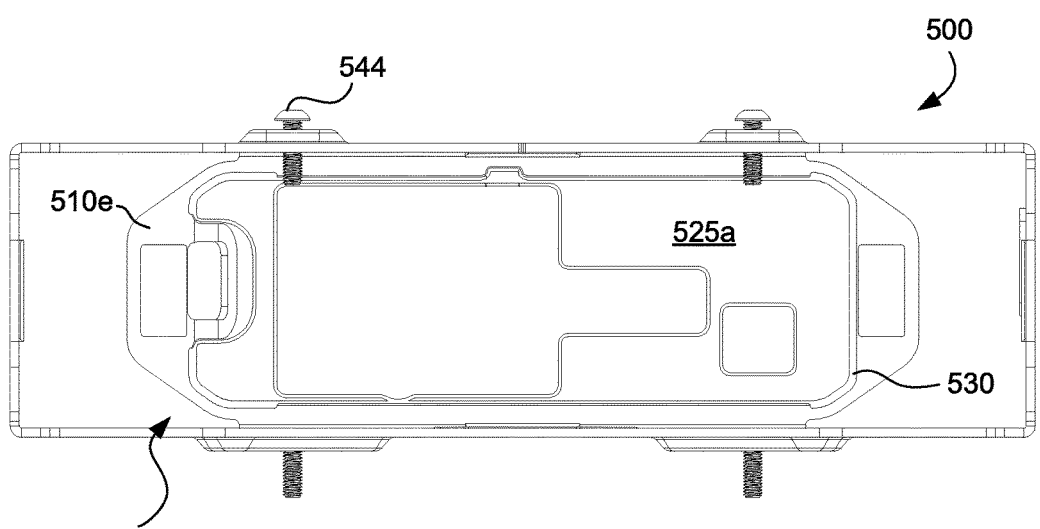

In FIG. 5F, port access opening 515b is illustrated in panel 510a. Security insert 525b is shown without security insert opening. Security insert 525b includes a raised inner portion 535b that corresponds to and fits within port access opening 515b. Though obscured behind panel 510b in FIG. 5E, security insert 525b also includes a perimeter portion that is larger than port access opening 515b.

Returning to FIG. 5A, enclosure 500 may also comprise a retaining mechanism 520. Retaining mechanism 520 may be used to secure a computing device within enclosure 500. As such, retaining mechanism 520 may also secure security inserts, such as 525a and 525b within port access openings 515a and 515b of enclosure 500. As noted above, a computing device may also be secured within enclosure 500 using fasteners that attach to a mounting interface of the computing device, as shall be discussed hereinafter.

Enclosure 500 may also include multiple mounting interfaces 540, as shown in FIGS. 5A and 5B. Mounting interface 540 in FIG. 5A includes apertures (e.g., aperture 542a) for attaching enclosure 500 to a support (e.g., a support surface 464 of FIG. 4A). Apertures may also be included for securing a computing device within enclosure 500 (e.g., aperture 542b). As noted above, there may also be tool apertures 555. For example, tool aperture 555 may be aligned with an aperture of an opposing panel, such as aperture 542 of panel 510c, shown in FIG. 5B. As such, a tool may be inserted into tool aperture 555 to secure enclosure 500 to a mounting surface, such as display-side support 462 of FIG. 4C.

Enclosure 500 is shown in FIGS. 5A-5H as including a number of support projections, such as support projection 575c in FIG. 5C and support projection 575d in FIG. 5D. Support projections may reduce risk of damage to internal components of a computing device from fasteners, by way of example. The particular arrangement of support projections (e.g., 575c and 575d) are merely provided by way of example and are not to be taken in a limiting sense. That said, the arrangement of support projections (e.g., such as example support projection 575d in FIG. 5D) may be selected to correspond to mounting interfaces of support structures, may provide structural strength and/or rigidity, and/or may provide stability. Other considerations in selecting a particular arrangement of support projections may include screw arrangement (e.g., including multiple apertures) and material breakage (e.g., by allowing reduced panel material thickness as compared to other approaches without support projections).

Enclosure 500 may also include contact structures 550 arranged on an interior surface of a panel, such as panel 510d. In one implementation, contact structures 550 may comprise foam strips or other like supple materials at points-of-contact with a computing device.

In view of the foregoing, an example computing device mounting enclosure comprises a frame having an opening to receive a computing device. The enclosure also comprises a plurality of panels and a retaining mechanism to retain the computing device within the frame. One of the plurality of panels comprises a port access opening. The enclosure also includes a security insert to be secured to the frame to restrict access to a port of the computing device through the port access opening.

In one example enclosure, the retaining mechanism is a loop formed in the frame. In one example enclosure, the security insert has a perimeter portion that is larger than the port access opening, and a raised inner portion to engage within the port access opening.

One example enclosure also comprises a first set and a second set of mounting apertures. The first set and the second set of mounting apertures are arranged on opposing panels of the plurality of panels. In one case, the first set and the second set of mounting apertures are offset and a set of tool holes are arranged in proximity to the first set of mounting apertures to allow access to fixing mechanisms in the second set of mounting apertures.

For one example enclosure, the security insert is to be released from the rigid frame responsive to release of the computing device from the frame.

In another implementation, a rigid computing device mounting sleeve comprises a planar upper panel arranged substantially parallel to a lower planar panel and a first planar side panel arranged substantially parallel to a second planar side panel. The first planar side panel and second planar side panel are substantially perpendicular to the planar upper and lower panels. Further, the first planar side panel is connected to the planar upper panel and the planar lower panel, and the second planar side panel is connected to the planar upper panel and the planar lower panel. A planar back panel is substantially perpendicular to the planar upper and lower panels and the first and second planar side panels. The planar back panel includes a port access opening. A security insert is to be retained within the port access opening and to restrict access to a port of a computing device.

In one case, the sleeve comprises a retaining mechanism to secure the computing device within the sleeve. In one example, the secured computing device retains the security insert within the port access opening. The retaining mechanism may be a loop integrally formed in the sleeve.

In one example sleeve, the security insert has a perimeter portion that is larger than the port access opening, and a raised inner portion to engage within the port access opening. In one example, the sleeve comprises a first set of mounting apertures for securing the sleeve to a support structure. The sleeve also comprises a second set of mounting apertures arranged opposite the first set of mounting apertures. The first set and the second set of mounting apertures may be offset and a set of tool holes are arranged in proximity to the first set of mounting apertures to allow access to fixing mechanisms in the second set of mounting apertures. The sleeve may also include contact structures on an inner surface of the sleeve to provide a supple point-of-contact with the computing device.

In yet another implementation, a rigid sleeve enclosure for a computing device comprises integrally formed and connected upper and lower panels connected to side panels and a back panel. The back panel has a port access opening. The enclosure includes mounting interfaces on the upper panel and the lower panel, a padlock loop integrally formed in one of the upper, lower, side, or back panels, and a security insert within the port access opening.

In one example case, the integrally formed and connected upper and lower panels may comprise a single piece of metal. The rigid sleeve enclosure may also include foam strips on an interior surface of the upper and lower panels. In one example case, the mounting interfaces on the upper and the lower panels are offset and a set of tool holes are arranged in one of the upper or the lower panels to allow tool access to fixing mechanisms to secure the rigid sleeve enclosure to a support surface. In one example case, the security insert has a perimeter portion that is larger than the port access opening, and a raised inner portion to engage within the port access opening.

In the preceding description, various aspects of claimed subject matter have been described. For purposes of explanation, specifics, such as amounts, systems and/or configurations, as examples, were set forth. It is noted that discussion of "upper," "lower," "side," "back," and the like was provided merely to simplify discussion, and claimed subject matter is not intended to be limited by such language (e.g., an "upper" panel may be, at times, a side and a lower panel, without limitation). In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A computing device mounting enclosure comprising:
   a frame having an opening to receive a computing device, a plurality of panels and a retaining mechanism to retain the computing device within the frame, wherein one of the plurality of panels comprises a port access opening;
   a security insert to be secured to the frame to restrict access to a port of the computing device through the port access opening; and
   a first set and a second set of mounting apertures, the first set and the second set of mounting apertures arranged on opposing panels of the plurality of panels, wherein the first set and the second set of mounting apertures are offset and a set of tool holes are arranged in proximity to the first set of mounting apertures to allow access to fixing mechanisms in the second set of mounting apertures.

2. The computing device mounting enclosure of claim 1, wherein the retaining mechanism comprises a loop formed in the frame.

3. The computing device mounting enclosure of claim 1, wherein the security insert comprises a perimeter portion that is larger than the port access opening, and a raised inner portion to engage within the port access opening.

4. The computing device mounting enclosure of claim 1, wherein the security insert is to be released from the frame responsive to release of the computing device from the frame.

5. A rigid computing device mounting sleeve comprising
   a planar upper panel arranged substantially parallel to a planar lower panel;
   a first planar side panel arranged substantially parallel to a second planar side panel, wherein the first planar side panel and second planar side panel are substantially perpendicular to the planar upper and lower panels, and further wherein the first planar side panel is connected to the planar upper panel and the planar lower panel and the second planar side panel is connected to the planar upper panel and the planar lower panel;
   a planar back panel substantially perpendicular to the planar upper and the planar lower panels and the first and the second planar side panels, the planar back panel comprising a port access opening;
   a security insert to be retained within the port access opening and to restrict access to a port of a computing device;
   a first set of mounting apertures for securing the sleeve to a support structure; and
   a second set of mounting apertures arranged opposite the first set of mounting apertures, wherein the first set and the second set of mounting apertures are offset and a set of tool holes are arranged in proximity to the first set of mounting apertures to allow access to fixing mechanisms in the second set of mounting apertures.

6. The rigid computing device mounting sleeve of claim 5 comprising a retaining mechanism to secure the computing device within the sleeve.

7. The rigid computing device mounting sleeve of claim 5, wherein the secured computing device retains the security insert within the port access opening.

8. The rigid computing device mounting sleeve of claim 5, wherein the retaining mechanism comprises a loop integrally formed in the sleeve.

9. The rigid computing device mounting sleeve of claim 5, wherein the security insert comprises a perimeter portion that is larger than the port access opening, and a raised inner portion to engage within the port access opening.

10. The rigid computing device mounting sleeve of claim 5 comprising contact structures on an inner surface of the sleeve to provide a supple point-of-contact with the computing device.

11. A rigid sleeve enclosure for a computing device, the rigid sleeve enclosure comprising:

integrally formed and connected upper and lower panels connected to side panels and a back panel, the back panel comprising a port access opening;

mounting interfaces on the upper panel and the lower panel;

a padlock loop integrally formed in one of the upper, lower, side, or back panels; and a security insert within the port access opening, wherein the mounting interfaces on the upper and the lower panels are offset and a set of tool holes are arranged in one of the upper or the lower panels to allow tool access to fixing mechanisms to secure the rigid sleeve enclosure to a support surface.

12. The rigid sleeve enclosure of claim 11, wherein the integrally formed and connected upper and lower panels comprise a single piece of metal.

13. The rigid sleeve enclosure of claim 11 comprising foam strips on an interior surface of the upper and the lower panels.

14. The rigid sleeve enclosure of claim 11, wherein the security insert comprises a perimeter portion that is larger than the port access opening, and a raised inner portion to engage within the port access opening.

* * * * *